United States Patent
Tan et al.

(10) Patent No.: US 8,055,769 B2
(45) Date of Patent: Nov. 8, 2011

(54) METHOD AND SYSTEM FOR SECURE DISTRIBUTION AND UTILIZATION OF DATA OVER A NETWORK

(75) Inventors: Kaijun Tan, Irvine, CA (US); Michael L. Cochran, Aliso Viejo, CA (US); Logan Badia, Fullerton, CA (US)

(73) Assignee: SafeNet, Inc., Belcamp, MD (US)

( * ) Notice: Subject to any disclaimer, the term of this patent is extended or adjusted under 35 U.S.C. 154(b) by 949 days.

(21) Appl. No.: 11/906,928

(22) Filed: Oct. 4, 2007

(65) Prior Publication Data

US 2008/0098223 A1 Apr. 24, 2008

Related U.S. Application Data

(62) Division of application No. 09/920,919, filed on Aug. 2, 2001, now abandoned.

(51) Int. Cl.
*G06F 15/173* (2006.01)
*G06F 15/16* (2006.01)
*G06F 21/00* (2006.01)

(52) U.S. Cl. ............ 709/225; 709/229; 705/55; 705/56; 726/9

(58) Field of Classification Search .................. 709/225, 709/229; 726/9; 705/55–56
See application file for complete search history.

(56) References Cited

U.S. PATENT DOCUMENTS

| | | | |
|---|---|---|---|
| 5,590,197 A | 12/1996 | Chen et al. | |
| 5,754,656 A | 5/1998 | Nishioka et al. | |
| 5,809,144 A | 9/1998 | Sirbu et al. | |
| 5,889,860 A | 3/1999 | Eller et al. | |
| 5,983,273 A | 11/1999 | White et al. | |
| 5,987,140 A | 11/1999 | Rowney et al. | |
| 5,995,626 A | 11/1999 | Nishioka et al. | |
| 6,111,956 A | 8/2000 | Field et al. | |
| 6,233,682 B1 | 5/2001 | Fritsch | |
| 6,246,996 B1 | 6/2001 | Stein et al. | |
| 6,247,129 B1 | 6/2001 | Keathley et al. | |
| 6,367,019 B1* | 4/2002 | Ansell et al. | 726/26 |
| 6,490,680 B1* | 12/2002 | Scheidt et al. | 713/166 |
| 6,735,311 B1* | 5/2004 | Rump et al. | 380/231 |
| 6,742,023 B1 | 5/2004 | Fanning et al. | |
| 6,779,115 B1 | 8/2004 | Naim | |
| 7,117,365 B1* | 10/2006 | Rump et al. | 713/176 |
| 7,324,974 B1* | 1/2008 | Cho et al. | 705/51 |
| 7,734,682 B2* | 6/2010 | Aubry et al. | 709/203 |
| 2001/0051996 A1 | 12/2001 | Cooper et al. | |
| 2002/0002541 A1 | 1/2002 | Williams | |
| 2002/0004902 A1 | 1/2002 | Toh et al. | |
| 2002/0029350 A1 | 3/2002 | Cooper et al. | |
| 2003/0163787 A1 | 8/2003 | Hay et al. | |
| 2005/0149759 A1 | 7/2005 | Vishwanath et al. | |
| 2007/0078980 A1* | 4/2007 | Tomita et al. | 709/225 |
| 2010/0115507 A1* | 5/2010 | Chatani et al. | 717/178 |

* cited by examiner

*Primary Examiner* — Larry Donaghue
(74) *Attorney, Agent, or Firm* — Drinker Biddle & Reath LLP (57) ABSTRACT

A method of securely utilizing downloaded data includes the steps of opening a media player; opening a data file; requesting a portable token from and used by a client, the portable token being a physical device removeably coupleable to a client computer; reading a distinguishing number from the token; and verifying a digital message linking the data file to the token using the media player, the distinguishing number, and a private key in the token. The digital message is required to access the data.

7 Claims, 7 Drawing Sheets

METHOD AND SYSTEM FOR SECURE DISTRIBUTION AND UTILIZATION OF DATA OVER A NETWORK

CROSS-REFERENCE TO RELATED APPLICATION

This application is a divisional of co-pending application Ser. No. 09/920,919, filed Aug. 2, 2001, and is assigned to the same assignee as the parent application.

BACKGROUND

1. Field of the Invention

The present invention relates to the field of data distribution and, in particular, to the secure distribution and utilization of data, such as, for example, confidential or proprietary documents or audio, video, multimedia or other entertainment content, over a network.

2. Description of Related Art

The ease with which data may be copied and distributed over public and private networks has been a major impediment to the widespread use of networks as a medium for the sale and distribution of data. In particular, the inability to prevent the illegal copying and/or distribution of copyrighted material or the pilfering of proprietary documents has thwarted the commercial use of networks as a viable sales and distribution channel.

In the area of entertainment content, copyright violations have been particularly egregious. The illegal copying and distribution of copyrighted material has gone virtually unchecked, with little recourse to the copyright owners. The recent decision of a federal court to issue an injunction shutting down the song-swapping web site NAPSTER is further indication that, up to the present time, little has be done to prevent illegal copying and distributing over public networks except to prevent use of the network for transmission of copyrighted material altogether. Thus, content owners are still not able to tap the massive markets that exist for online sale and distribution of audio, video, multimedia and other entertainment content.

In addition, the exchange of confidential or proprietary data over public networks such as the Internet, although being tremendously convenient and offering tremendous savings in time and money, has still not been fully embraced by businesses and other networking communities due to concerns over privacy and confidentiality. The ever-present threat of pilfering of such data has prompted many businesses and organizations to recommend that such data be exchanged by means other than an electronic network.

The security, privacy and confidentiality issues associated with data or content distribution over a network have been addressed by several techniques, all with limited success. For example, one of the first techniques to address the distribution of data and content over public networks involved encryption/decryption. In an effort to prevent unauthorized access to data being sent over a network, data may be encrypted in such a manner that it can be decrypted only by the recipient. While this technique may be effective to prevent hacking during transmission of the data, encryption/decryption techniques do nothing to prevent illegal copying and redistribution of the data once the data has been decrypted by the recipient.

Other techniques have sought to prevent illegal copying and distribution of data over networks by identifying the owner of the data within the data itself. For example, certain identifying data, commonly known as a "digital watermark" and deriving its name from a traditional watermark seen on checks and other documents, may be added to data so that the owner, creator, distributor or other interested party may be identified within the data. In addition, a digital watermark may communicate copyright information, such as the owner of the copyright to the data, when the data was first copyrighted, whom the recipient may contact in order to inquire about licensing rights, and the like.

Unfortunately, digital watermarking alone has been insufficient to prevent widespread illegal copying and distributing of copyrighted material. Many in the networking community simply ignore digital watermarks. Moreover, enforcement by copyright owners using digital watermarks alone is tremendously difficult. Even if an unscrupulous user of copyrighted material is aware of a digital watermark, the user can copy and redistribute the data hundreds and even thousands of times without knowledge by the copyright owner. There is little the copyright owner can do to prevent this.

One technique for monitoring the distribution of information that is accessible through a public network is disclosed in U.S. Pat. No. 5,889,860, Encryption System With Transaction Coded Decryption Key. According to the '860 patent, a client who has chosen to purchase online data, such as a song, enters payment information and is assigned a password that is specific to the client and the transaction. The password functions as a decryption key to enable use of the data by the client. Should the client improperly copy and redistribute the data and the decryption password, the copies can be traced back to the client based on client identifying information encoded in the password.

Although possibly effective for identifying clients who have copied and redistributed data, the technique of U.S. Pat. No. 5,889,860 offers no method of enforcement. Similar to the case of digital watermarking, many clients are unconcerned that information identifying them is passed along with the data to unauthorized third parties. As far as the copyright owner is concerned, it is tremendously difficult to determine that data is being copied and redistributed over a public network and, even if it were not difficult, the volume typically associated with the illegal copying and redistributing of popular data is so great that any practical attempts to enforce copyrights would currently be futile.

SUMMARY OF THE DISCLOSURE

Embodiments of the present invention relate to methods and systems for the secure distribution and utilization of data over a network. Methods according to embodiments of the present invention may include issuing a certificate and a private key to a client for identifying the client in a transaction. The certificate and private key may be stored in a token used by the client during the transaction. Before distributing data to the client, the client's identity may be verified using the certificate and a digital signature signed using the private key.

A message may be generated by a server and associated with the data being downloaded to the client and further associated with the token used by the client during the transaction. Once the client's identity has been verified and a message generated, data may be distributed to the client.

A client and a server may communicate over a secure network connection. Using the secure network connection, the server may issue the certificate and private key to the client. The secure network connection may use a secure socket layer protocol or other secure protocol. Prior to issuing a certificate and private key and storing them in the client's token, the server may ask the client to establish a password for the token. The server may also ask the client to establish a password for a client account.

The token may interface to the client's computer. The certificate and private key may be stored in the token by writing them to the token across the network. Alternatively, the certificate and private key may be stored in the token by writing them to the token at the server computer.

A client may request data to be distributed from a server. Prior to distributing the data, the server may request that the client send the server the client's certificate. The server may also request that the client send the server a digital signature. The server may also request a distinguishing number of the token. Once the server has verified the client's identity, the server may generate a message associated with the data and the token and distribute the data to the client over a network.

A system for distributing data over a network according to embodiments of the present invention may include a client computer for requesting data over a network, the client computer being interfaced to the network, a server computer for distributing requested data over a network, the server computer being interfaced to the network, and a token interfaced to the client computer. The server computer may store the certificate and private key in the token. Furthermore, the server computer may verify the identity of the client with the client's certificate in the token before distributing data to the client.

A system for distributing data over a network according to embodiments of the present invention may further include a firewall interfaced to the network and a cryptographic processor interfaced to the server computer and the firewall.

According to embodiments of the present invention, a third party computer system may interface to the network. The third party computer system may issue a certificate and a private key and stores them in the token.

These and other objects, features, and advantages of embodiments of the invention will be apparent to those skilled in the art from the following detailed description of embodiments of the invention when read with the drawings and appended claims.

DETAILED DESCRIPTION

In the following description of preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the preferred embodiments of the present invention.

Embodiments of the invention are directed toward a method and system for the secure distribution and utilization of data over a network. Embodiments of the present invention allow data, including, without limitation, data in the form of entertainment content such as audio and video, to be distributed over a network to consumers, companies or other individuals or entities while reducing the risk that such data is subsequently copied illegally or redistributed without authorization. Embodiments of the invention may be implemented by individuals or large organizations. For example, embodiments of the invention may be implemented by entertainment content owners desirous of distributing music, movies, games, videos and other multimedia over networks such as the Internet.

Figure 1:
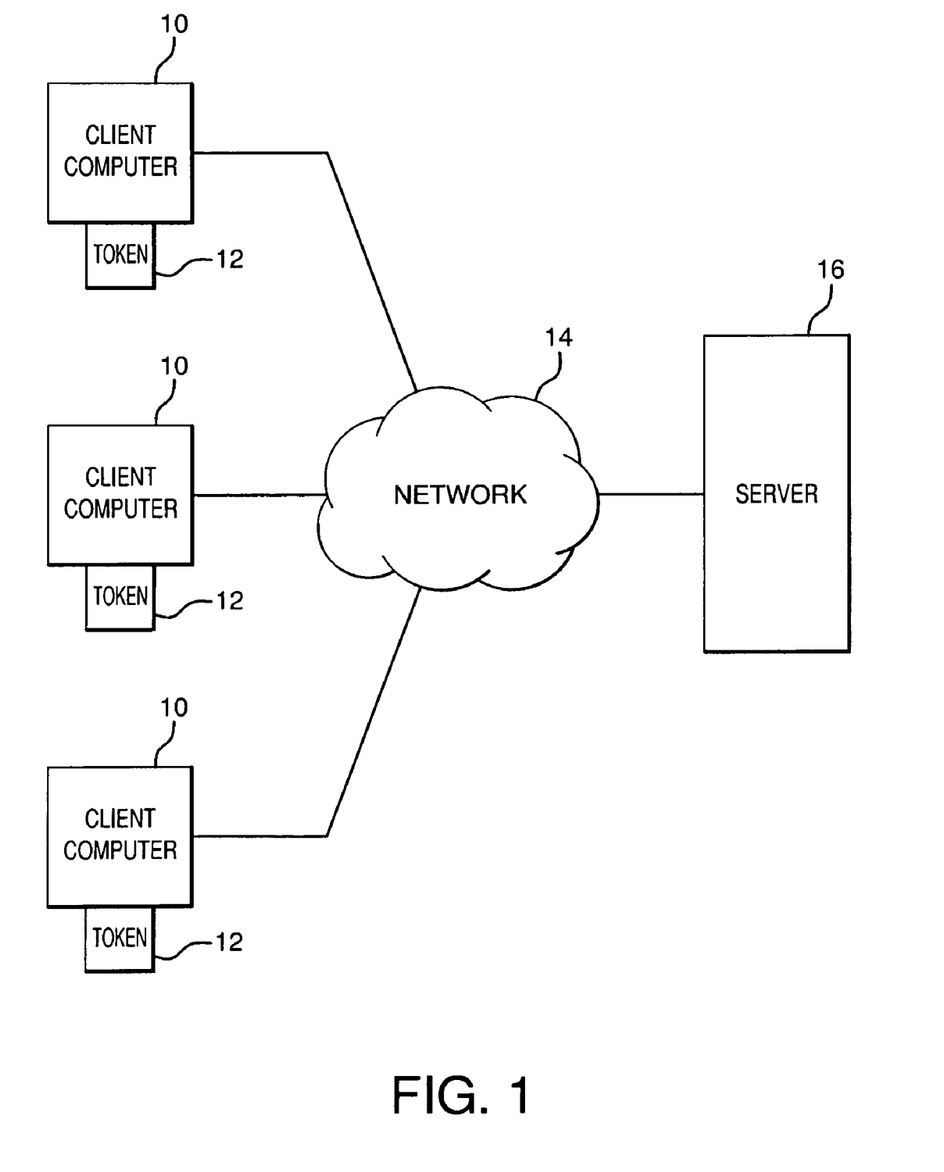
FIG. 1 is a general system for the secure distribution and utilization of data over a network according to an embodiment of the present invention.

Embodiments of the present invention may be implemented in a variety of ways. FIG. 1 shows a general system configuration on which embodiments of the present invention may be implemented. A client computer or other computing device 10 has a connection to a network 14. The client computer or other computing device 10 may contain, without limitation, a processor or processors, memory and other components as are common in the industry.

The network 14 may be a public network, a private network, or a combination thereof. For example, in a typical workplace environment, a client computer 10 may be connected via an Ethernet connection to a local area network (LAN), which, in turn, is connected to a larger public network, such as the Internet. Alternatively, if the client computer 10 is a stand alone PC in the client's home and the network 14 is the Internet, the client may connect to the network 14 through an Internet Service Provider (ISP) using a standard modem connection.

A server 16 also connects to the network 14 such that the client computer 10 and the server 16 may communicate with each other over the network 14. The server 16 may contain, without limitation, a processor or processors, memory and other components as are common in the industry.

Interfaced to the client computer or other computing device 10 is a token 12. The token may be a discreet piece of hardware that interfaces in some manner to the computer or other computing device 10. For example, the token 12 may be in the form of a smart card, a floppy disk, a CD-R, or a removable hard drive. Alternatively, the token may be an IKEY™ hardware token, made by RAINBOW TECHNOLOGIES, Irvine, Calif. In one embodiment of the invention, the information in the token is difficult for a general user to read. In addition, the token may be sealed within a security boundary, i.e., a physical boundary or border, outside of which it may be relatively easy to write information into the token but relatively difficult to read information from the token. Thus, the token may physically protect information, such as private keys, such that the information never exits the token. Cryptographic operations associated with protected keys may be performed within the token itself.

The token 12 may interface to the computer 10 in a variety of ways. For example, the token 12 may interface to the computer 10 via a cable. Alternatively, the token 12 may interface to the computer 10 via wireless link, such as, for example, an RF, optical or infrared link. If, for example, the token 12 is an IKEY™ hardware token, the token 12 may plug into a Universal Serial Bus (USB) port on the computer 10.

The token 12 may come in a variety of sizes and form factors. For example, if the token 12 is an IKEY™ hardware token, the token 12 may be small enough and lightweight enough to placed on a key ring or other type of key holder. The token may be kept and guarded by the client, much in the same way the client would keep and guard credit cards, house keys, car keys and other valuables.

Figure 2:
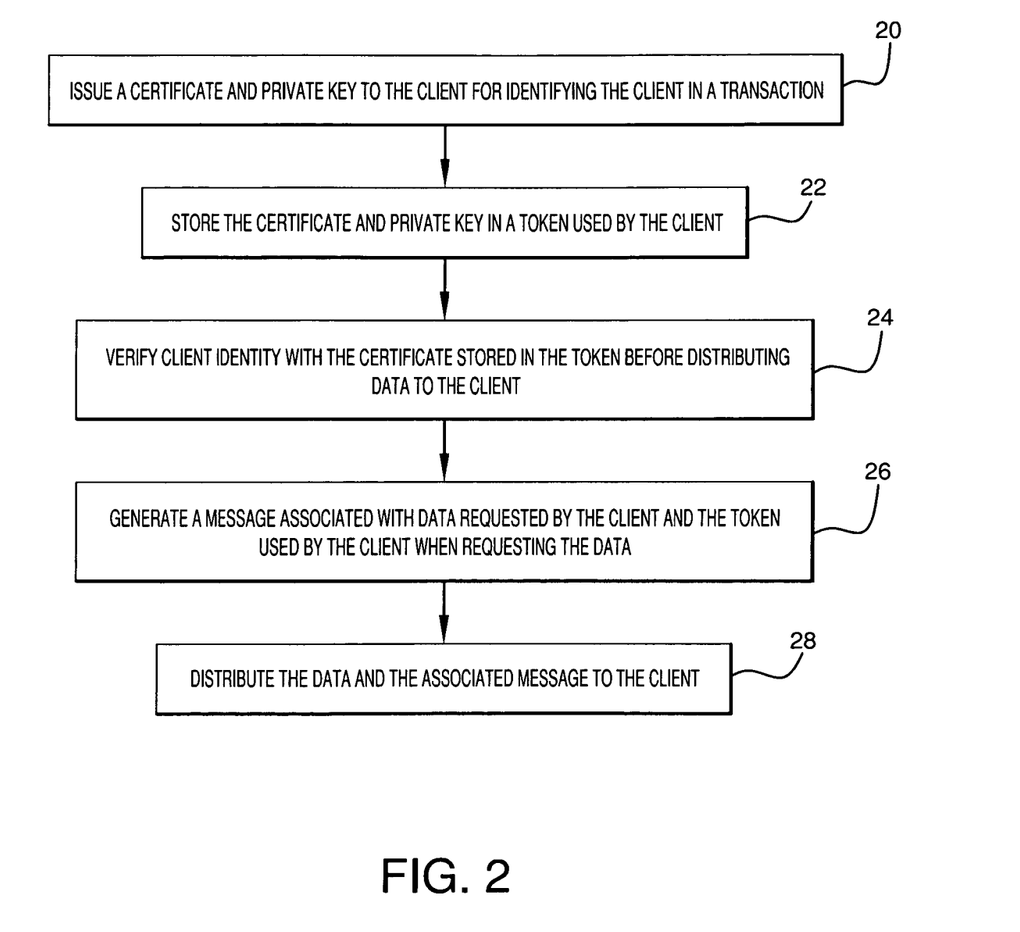
FIG. 2 is a flowchart of a general method for the secure distribution of data over a network according to an embodiment of the present invention.

FIG. 2 shows a generalized method for secure data distribution according to an embodiment of the present invention. At step 20, an individual, a company, a distributor or some other entity in control of data and intending to distribute the data in a secure manner issues a certificate and a private key to a client requesting the data. The certificate and private key are used to authenticate the client during a transaction in which the client requests data. The data may consist of confidential or proprietary documents or, alternatively, may be entertainment content, such as, for example, music, a movie, multimedia or some other type of audio or video content.

Once a certificate and private key has been issued to a client at step 20, they may be stored in a token used by the client at step 22. As stated previously, the token may be a discreet piece of hardware that interfaces in some manner to a computer or other computing device.

Once a certificate and private key identifying a client have been stored in the token at step 22, the client is then ready to download data. The client may download data during the session in which the client's certificate and private key was stored in the token or during another session at a later time. Whenever the client is ready to download data, the client's identity may be verified by a server operated by the individual, company, distributor, or other entity using the client's certificate before distributing data at step 24. For example, assume a client, at some time after receiving a certificate and private key, interfaces the token containing the certificate and private key to a computer and visits a music distribution company's web site. After perusing the music available for download, the client may request a download of a particular song in digital form. Prior to distributing the song to the client, the client's identity is authenticated with the client's certificate stored in the token, thereby ensuring that the downloading of data to the client is authorized.

Once the client's identity is verified with the certificate, at step 26 a message may be generated by the server which is associated with the data requested by the client and the token used by the client when making the request. As will be explained in greater detail below, the message, in conjunction with the token in which a certificate has been stored, may be used to prevent illegal copying, theft, and/or subsequent distribution of the data downloaded by the client.

After the message is generated at step 26, the encrypted data and the associated message are distributed to the client at step 28. The client is then free to use the data. For example, if a song in digital form has been distributed to the client, the client may listen to the song at any time, using an appropriate media player, by interfacing the token used during the session in which the distribution was made to the computer on which the song resides.

Figure 3:
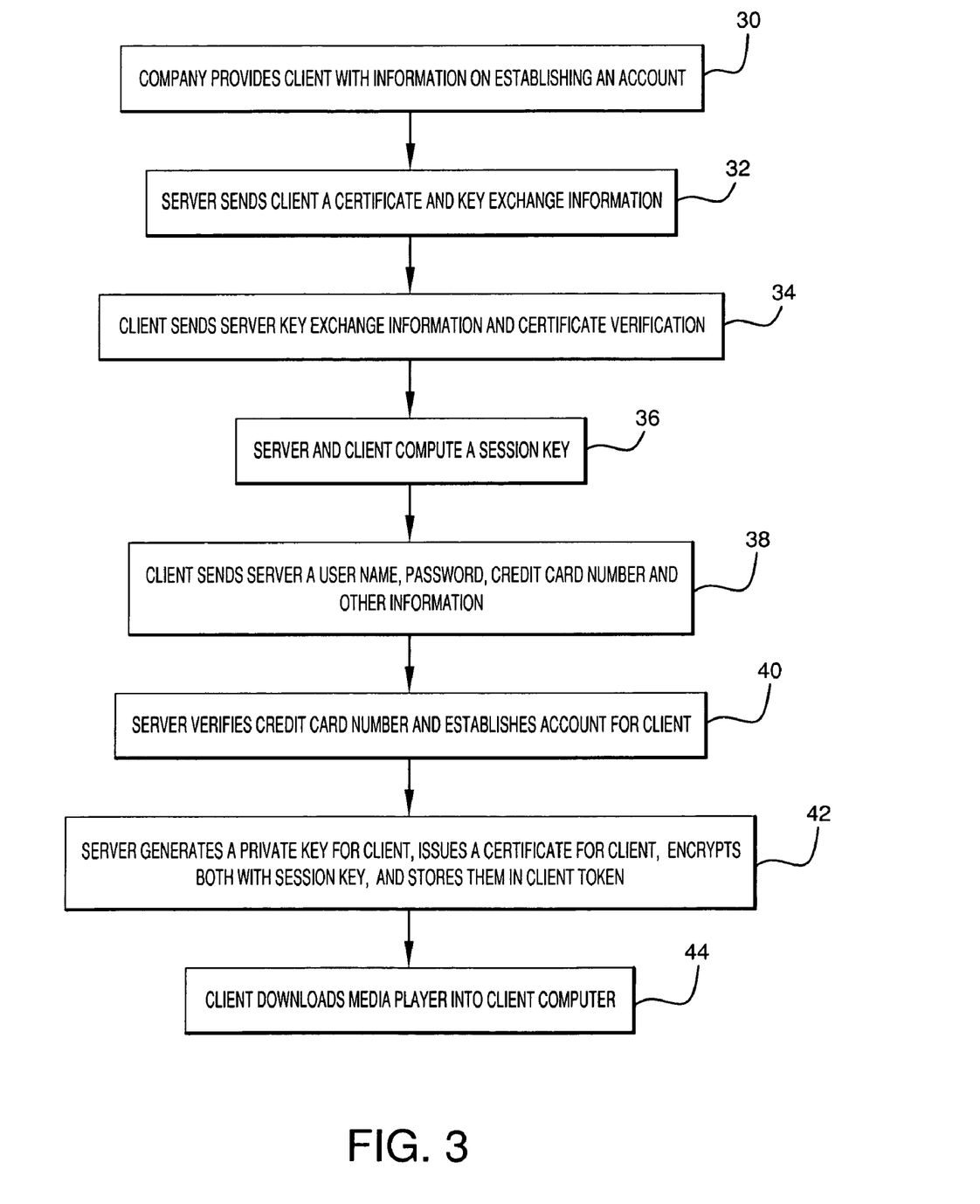
FIG. 3 is a flowchart of a method for issuing a certificate and private key and storing them in a token according to an embodiment of the present invention.

A certificate and private key may be issued in a variety of contexts. For example, a certificate and private key may be issued in the course of establishing an account between a content distributor and a consumer. Such would be the case, for example, if a consumer wanted to establish an account with a music distribution company. According to an embodiment of the present invention, the music distribution company would issue a certificate and a private key to the consumer and store them in a token used by the consumer. FIG. 3 shows a detailed method of issuing a certificate and private key and storing them in a token according to an embodiment of the present invention in the general context of a content distribution company.

At step 30, a content distribution company or other company provides a client, i.e., a consumer, with enough information necessary to establish an account between the company and the client. The information may include, but is not limited to, providing a client with a company name and a web site address.

The company may provide this information in a variety of ways. For example, such information may be made available through a retail store. If a client is interested, for example, in purchasing music, movies or the like over a network such as the Internet and visits a retail store where the company's music, movie or other distribution services are advertised, the client may obtain a package at the retail store containing company information and instructions that direct the user to the company's web site. The client may then go to a computer or other device to access the company's web site, logon to the web site and begin the process of establishing an account with the company.

Once the client has logged on to the company web site, a secure connection may be established between the company server and the client. The secure connection may be established in a variety of ways. For example, the widely-implemented Secure Socket Layer (SSL) protocol may be used in establishing a secure connection between the server and the client. Alternatively, other protocols may be used in establishing a secure connection between the server and the client. When establishing a secure connection between the server and the client using SSL, the client may send the server a protocol version number, a session identifier, cipher settings, random numbers, and other information necessary for communicating with the server. In turn, the server may send the client a protocol version number, a session identifier, cipher settings, random numbers, and other information necessary for communicating with the client.

Regardless of any protocol used for the connection between the client and the server, at step 32, the server sends the client its certificate and key exchange information. In turn, the client sends the server verification of the server's certificate and key exchange information at step 34. Subsequently, the server and the client may compute a session key for the session at step 36. After the session key has been computed, a secure connection between the server and the client will have been established.

Once the session key has been computed and a secure connection established, at step 38 the server may request and the client may send to the server a variety of information, such as, for example, a user name, a password for an account, a credit card number and any other information, such as, for example, addresses, telephone numbers and the like, which may be necessary for the client to establish an account with the company as determined by the company, all of which will have been encrypted with the session key. Once the server has obtained the requisite information from the client, the server may verify the client's credit card number and establish an account for the client at step 40.

During this time, terms of the account may also be established. For example, if the company distributes music over a network, the client may choose a variety of payment methods. The client may choose to have his credit card charged a monthly fee for a predetermined number of downloads. Alternatively, the client may choose to have his credit card charged per download. The client and the company may establish any payment method suitable to both parties.

Other terms of the account may also be established at this time. For example, in the case of a music distribution company, the duration for which a song may be enabled for listening may depend on the amount of money a client has paid for the song. A small fee charged to the client's credit card may enable the client to listen to the song for a predetermined period of time. A larger fee charged to the client's credit card may enable the client to listen to the song for an unlimited period of time. As with the payment methods, the client and the company may establish any terms suitable to both parties.

Subsequent to the establishment of the account, the server may generate a private key for the client, issue a certificate for the client, encrypt both of them with the session key, and store the private key and the client certificate in the client's token at step 42. The server may store the private key and the client certificate in the client's token in a variety of ways. For example, if the chosen token is an IKEY™ hardware token, the token is lightweight and portable, and may be easily included in the package obtained by the client at a retail store. Thus, subsequent to account establishment, the server may direct the client to insert the token into a port on the computer or other device used for the session. The port may connect to a serial bus such as the USB. Thus, with the token connected to a USB port of the device being used by the client, the server may store the private key and the client certificate directly into the token by sending the private key and the client certificate in encrypted form to the token over the network.

Alternatively, the server may store the private key and the client certificate into the token at the server location. The token may then be sent to the client using regular mail or delivery services.

Once a private key and client certificate have been stored in the client's token, the client may download a media player or other enabling player into the client computer or other device used by the client to utilize downloaded data at step 44. The client is then ready to purchase data over a network and listen to, watch, play, read or utilize in any way, as the case may be, the data downloaded from the server.

Figure 4:
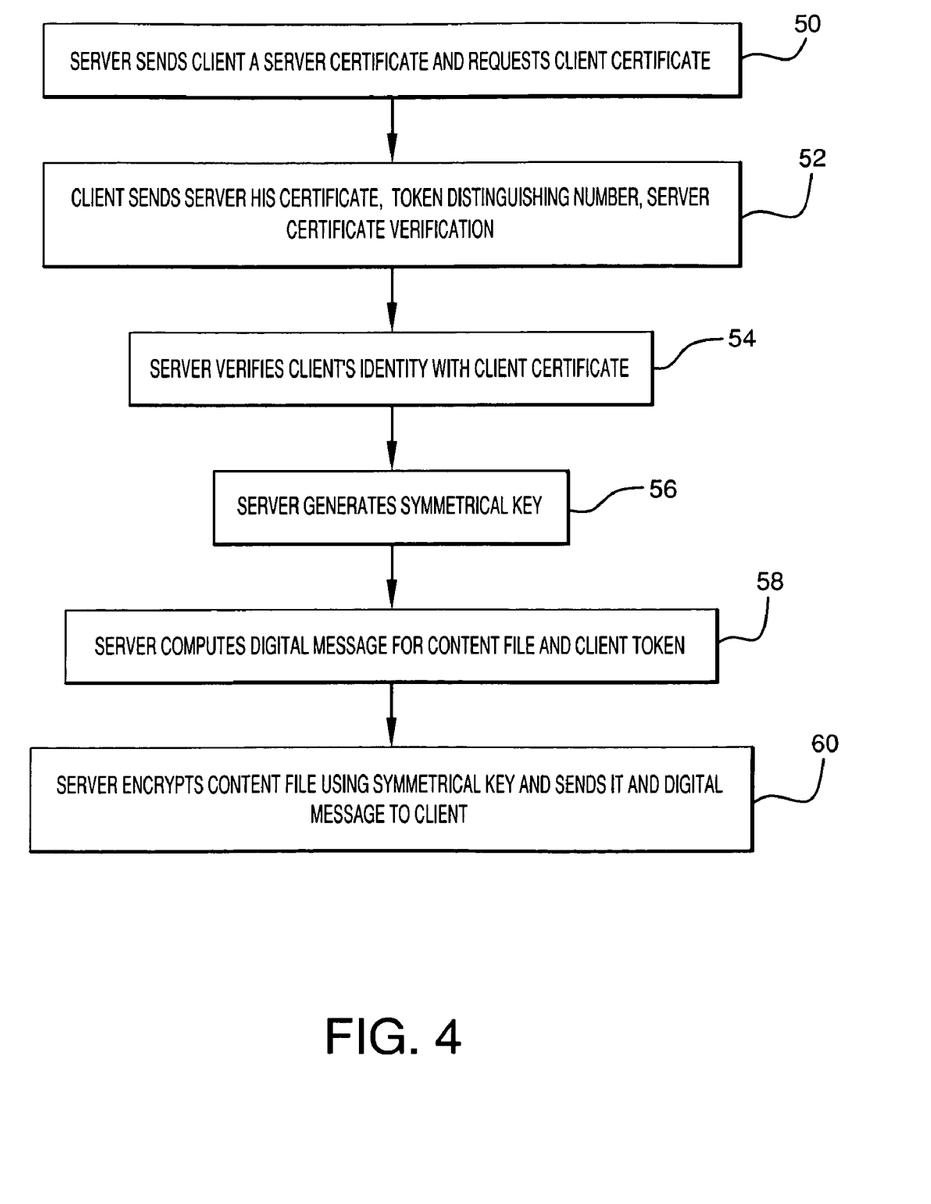
FIG. 4 is a flowchart of a method for verifying the client's identity with the client's certificate, generating a message, and distributing data according to an embodiment of the present invention.

FIG. 4 shows a detailed method according to an embodiment of the present invention of verifying a client's identity with a certificate stored in a token; generating a message associated with data requested by the client and the token used by the client; and distributing the data and the associated message to the client in response to a request by the client to purchase data.

Once a client has decided to purchase or lease data over a network, whether such data be in the form of entertainment content or otherwise, and has logged on to a company web site, the client and the server may authenticate each other. The authentication between the client and the server may be accomplished in a variety of ways. A variety of protocols may be used for the authentication process. As before, for example, the SSL protocol may be used for authentication between the server and the client. The client may send the server a protocol version number, a session identifier, cipher settings, random numbers, and other information necessary for communicating with the server. In turn, the server may send the client a protocol version number, a session identifier, cipher settings, random numbers, and other information necessary for communicating with the client.

The server may send a client a server certificate so that the client may verify the identity of the server at step 50. Additionally, the server may request that the client send the client's certificate to the server so that the server may verify the identity of the client.

At step 52, the client sends the server the client certificate that was issued to the client when the client first established an account with the content distribution company. The client may also send the server a verification of the server identity with the server's certificate, thereby notifying the server that the client recognizes the identity of the server.

Also, the token used by the client during the transaction may be marked with a distinguishing number. The distinguishing number may be a permanent marking on the token to identify the token. The distinguishing number may be assigned by the token manufacturer at the time of token fabrication. Thus, the token distinguishing number may not be modified or removed from the token and serves to identify the token during its lifetime. At step 52, the client may also send the token distinguishing number to the server. If desired, the server may verify the token distinguishing number sent by the client during the current session with the token distinguishing number sent by the client when the account was established, thereby giving the server a heightened sense of security in identifying and verifying the client requesting the download.

Once the client sends the server the client certificate, server certificate verification and token distinguishing number, the server verifies identity of the client with the client certificate at step 54. Once the client's identity has been verified, a symmetrical key may be generated by the server at step 56, thereby establishing a secure connection and allowing data to be transferred from server to client in a secure, encrypted manner. The symmetrical key may be generated randomly.

Once the symmetrical key has been generated, the server computes a digital message for the data requested by the client and the client token at step 58. The digital message is, thereafter, associated with the data requested by the client and the token used during the session and serves to permanently link the data requested by the client with the token used during the session. The digital message may take a variety of forms. For example, the digital message may be computed using a public key (asymmetric) cryptographic algorithm and may contain a variety of information, including, without limitation, an identification number of the data the period of time for which the data may be used by the client, the distinguishing number of the token used during the session in which the data was requested or downloaded, and the symmetrical key used to encrypt the data when sent from the server to the client over a network. In notation form, the digital message according to an embodiment of the present invention may be in the form of:

$$D(DID+T+DN+E(S)_{pukc})_{prkd}$$

where D is the asymmetric cryptography decryption process using a private key, E is the asymmetric cryptography encryption process using a public key, DID is the identification number of the data, T is the period of time for which the data may be used by the client, DN is the distinguishing number of the token used during the session in which the data was requested or downloaded, S is the symmetrical key used to encrypt the data when sent from the server to the client over a network, pukc is the public key of the client and prkd is the private key of the server.

Once the digital message has been computed, the server encrypts the data using the symmetrical key and sends it and the digital message to the client at step 60. The client then may use the data in a desired manner or store the data for use at a subsequent time.

Figure 5A:
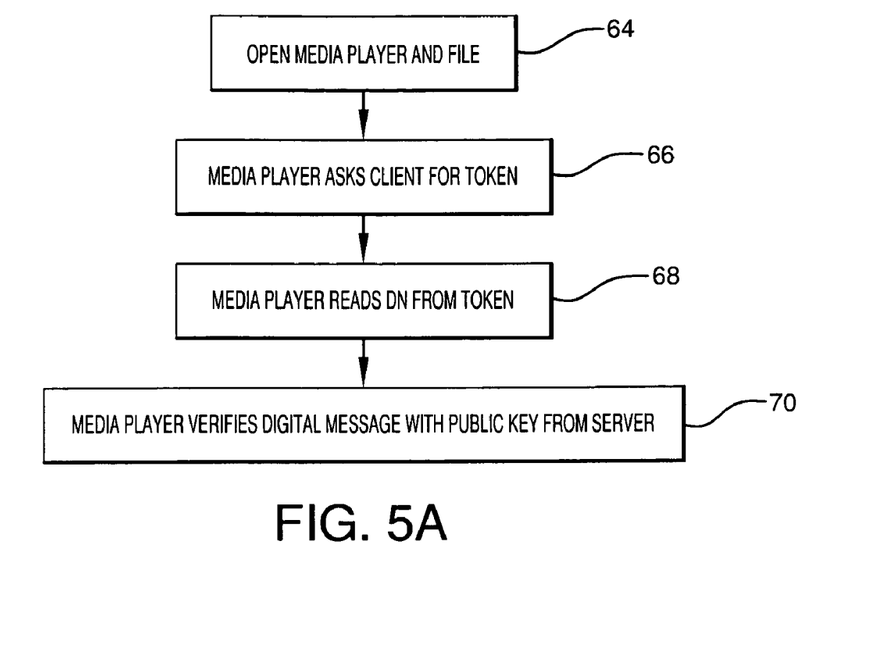
FIG. 5A is a flowchart of a method for utilizing data that has been downloaded to a client according to an embodiment of the present invention.

FIG. 5A shows a method of using data that has been downloaded from a server according to an embodiment of the present invention. If, for example, the client has downloaded a song in digital form, the client may wish to listen to the song at some point. Thus, at step 64 the client may open the requisite media player and the file containing the song data and the digital message that was downloaded in digital form from the music distributor's server. At step 66, the media player resident in the client computer may ask the client for a token. Thus, the client would then interface his token to the computer or other device currently being used. If, for example, the client is using an IKEY™ hardware token, the token may be inserted directly into a USB port of the computer or other device being used by the client.

At step 68, the media player reads the distinguishing number (DN) of the token. Next, at step 70, the media player verifies the digital message that was sent with the downloaded data, the details of which are explained below, with the public key of the distributor's server. Once the digital message has been verified, the media player plays the downloaded data.

Figure 5B:
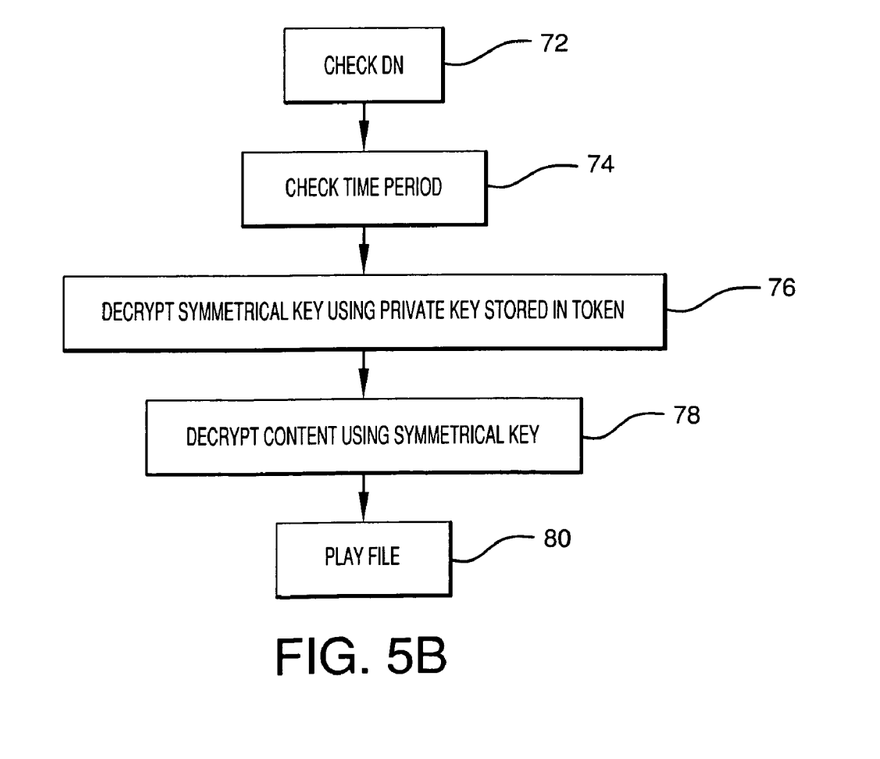
FIG. 5B is a flowchart of a method for verifying a digital message according to an embodiment of the present invention.

Details of the digital message verification of step 70 may be seen in FIG. 5B. According to an embodiment of the present invention, at step 72, the media player verifies the DN of the token with the DN that is part of the digital message. If the DN of the token matches the DN of the digital message, the media player then checks the time period associated with the data at step 74 to determine if the client is permitted to play the file according to the terms of the purchase agreement. If the client is within the allowable time period, the media player uses the private key from the token to decrypt the encrypted symmetrical key that was used to transfer data over the network between the server and the client at step 76. The media player may read the private key from the token. Alternatively, if the token is equipped with cryptographic processing capabilities, the media player may send the encrypted symmetrical key to the token so that it may be decrypted with the private key. Armed with the symmetrical key, the media player then decrypts the data that was downloaded at step 78.

If steps 72 through 78 are successful, i.e., if all compared values are equal and the encrypted symmetrical key and data can be properly decrypted, the media player may then play the file for the enjoyment of the client at step 80.

Thus, the methods and systems according to embodiments of the present invention may deter illegal copying or redistribution of data in a variety of ways. If the DN of the token does not match the DN of the data, which may occur if a token has been stolen or the data has been copied and sent to another client having another token, the media player will not play the file. In addition, if the time period for which the file may be played has expired, or if the time period for which the file may be played has not yet started, such as in the case where a file is downloaded at a particular time for use at a future time, the media player will not play the file.

If the data has been modified in any way, which may be the result of unscrupulous users attempting to circumvent the system by tampering with the data, the client generally will be aware of such modification because the data, in its modified form, will not be usable to the client. The client may then have the option of sending the digital message back to the server and ask the server to re-send the data to the client. The server can determine what data to send back to the client by using the DID in the digital message.

Furthermore, if downloaded data and the associated digital message is stolen from a client by an unscrupulous client having his own token, the file will still not play because only the private key from the original client's token can decrypt the encrypted symmetrical key when the symmetrical key is decrypted by the media player. In addition, the digital message cannot be forged by a third party since it was encrypted using the private key of the server.

According to further embodiments of the invention, if a client should lose the token or have the token stolen, the client may so notify the server that the token has been lost or stolen. The server may then revoke the client's certificate. Thus, should a third party attempt to use the token after the server has revoked the client's certificate, the token, which stores the client's certificate, will be rejected by the server. Thus, after a certificate has been revoked, the token storing the certificate will be essentially useless, thereby adding yet another layer of protection afforded by the methods and systems according to embodiments of the present invention.

In addition, use of the token by a third party who has stolen or otherwise illegally obtained the token may be further prevented by utilizing a password protection system with the token. As explained previously, when a client establishes an account with a server, the client may be required to furnish to the server a password for the account. The client may also be required to enter a password for the token. If a token has been stolen by a third party, the third party will not have knowledge of the password, thereby making it difficult for the third party to use the stolen token to purchase data.

The method of verifying a digital message and playing a downloaded file shown in FIGS. 5A and 5B are representative embodiments of the present invention. Other information may be included in the digital message and other methods according to embodiments of the present invention may be used to verify the digital message and utilize downloaded data.

Figure 6:
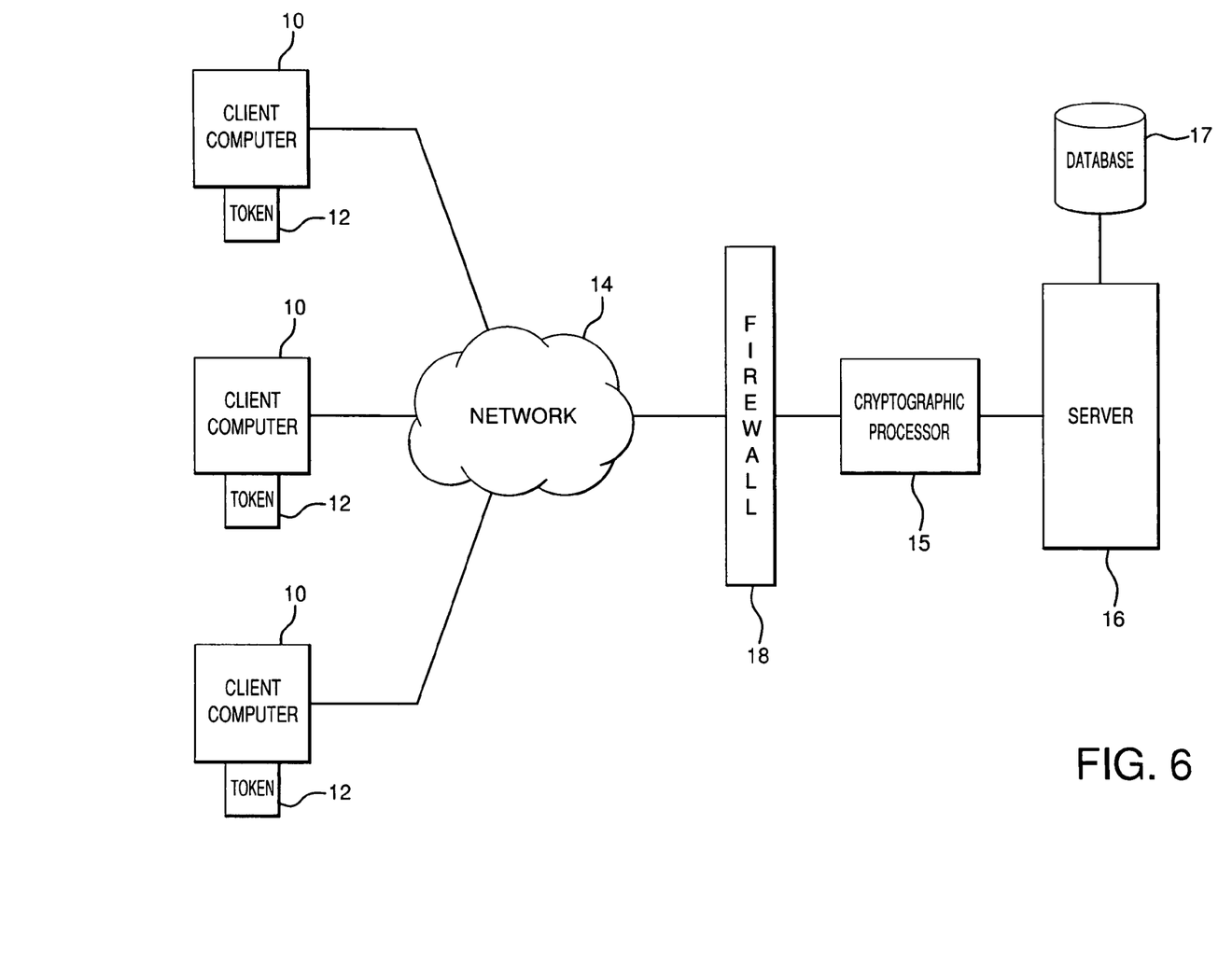
FIG. 6 is an alternative system for the secure distribution of data over a network according to an embodiment of the present invention.

Systems implementing embodiments of the present invention need not be limited to the system shown in FIG. 1. For example, FIG. 6 shows an alternative system according to embodiments of the present invention. A client computer or other computing device 10 connects to a network 14. Connected to the client computer or other computing device 10 is a token 12. A firewall 18 connects to the network 14 as an added layer of protection for the server 16. In addition, a cryptographic processor 15 may be connected between the firewall 18 and the server 16. The cryptographic processor 15 may handle some or all of the cryptographic and other functions performed by embodiments of the invention. For example, the cryptographic processor may function as a certificate authority. In addition, the cryptographic processor 15 may perform all of the functions necessary when establishing a secure connection between a server and a client, may generate digital messages and may encrypt data.

The server 16 may also be supplemented by a data base 17. The data base 17 may store account numbers, passwords, and any other of a variety of information required by a distributor to implement the particular embodiment of the present invention.

Figure 7:
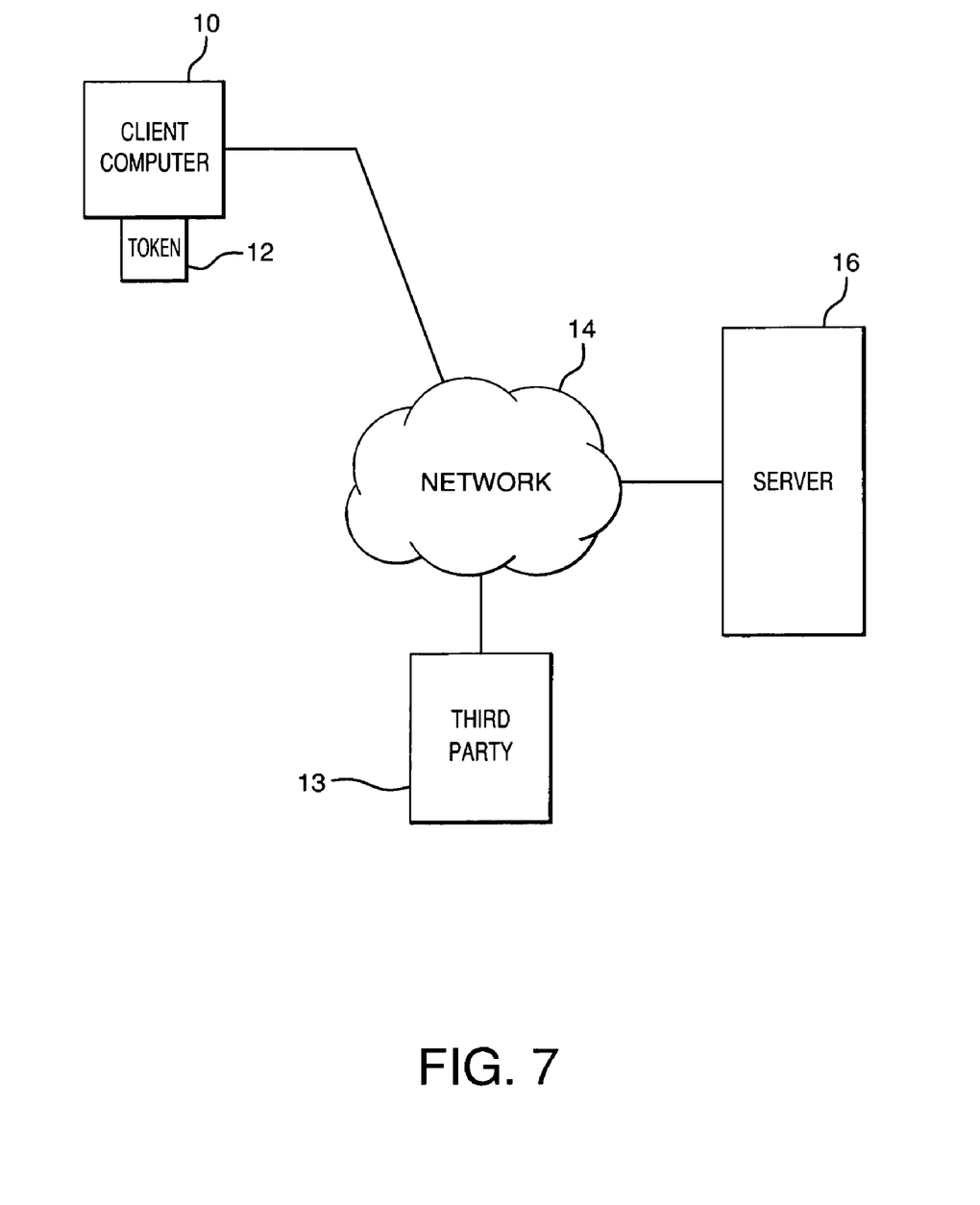
FIG. 7 is an alternative system for the secure distribution of data over a network according to an embodiment of the present invention.

FIG. 7 shows an alternative system according to embodiments of the present invention. A client computer or other computing device 10 connects to a network 14. Connected to the client computer or other computing device 10 is a token 12. Also connected to the network is a third party certificate authority 13. The third party certificate authority 13 may provide a variety of functions, including, without limitation, verifying clients, issuing client certificates, preliminarily establishing client accounts, and the like. The performance of such functions by the third party certificate authority may relieve the burden of these functions from the distributor's server, thereby allowing the server to focus its activities on downloading data requests made by clients.

The computer or other computing device 10 may be implemented in a variety of ways. For example, the computer or other computing device 10 may be a portable device such as a PALM™ handheld or other portable device. The portable device or other handheld may have a wireless connection to a network. For example, embodiments of the present invention may by implemented on a handheld device with a wireless connection to the Internet. Clients who are interested in, for example, downloading music from the Internet could interface their tokens to the handheld device and download music to the handheld device. If the handheld device is equipped with audio processing hardware, cryptographic capabilities, and an interface for the token, a media player on the handheld device could play the downloaded music file, thereby allowing the client to listen to music virtually anywhere.

Moreover, downloaded data is not limited to entertainment content. A variety of data may be downloaded according to embodiments of the present invention, including, without limitation, software, consumer information, account information, or other data.

While particular embodiments of the present invention have been shown and described, it will be obvious to those skilled in the art that the invention is not limited to the particular embodiments shown and described and that changes and modifications may be made without departing from the spirit and scope of the appended claims.

The invention claimed is:

1. A method of securely utilizing downloaded data comprising:
    opening a media player on a client computing device;
    opening a data file on the client;
    requesting a portable token from and used by the client, the portable token being a physical device removeably coupleable to the client;
    reading a distinguishing number from the token;
    verifying a digital message linking the data file to the token using the media player, the distinguishing number, and a private key in the token, wherein verification of the digital message is required to access data in the data file.

2. The method of claim 1, wherein in verifying the digital message, the media player reads the private key from the token to decrypt the digital message.

3. The method of claim 1, wherein in verifying the digital message, the media player sends the digital message to the token.

4. The method of claim 3, wherein the token decrypts an encrypted symmetric key using the private key.

5. The method of claim 1, wherein verifying a digital signature comprises:
    verifying the distinguishing number read from the token;
    verifying a time period associated with the data file;
    decrypting an, encrypted symmetrical key using the private key from the token;
    decrypting the data file using the symmetrical key.

6. The method of claim 1, wherein the distinguishing number is assigned to the token by a manufacturer.

7. The method of claim 6, wherein the distinguishing number is permanently assigned to the token.

* * * * *